US009148026B2

(12) United States Patent
Gagne et al.

(10) Patent No.: US 9,148,026 B2
(45) Date of Patent: Sep. 29, 2015

(54) CHARGER DETECTION WITH PROPRIETARY CHARGER SUPPORT

(71) Applicant: Fairchild Semiconductor Corporation, San Jose, CA (US)

(72) Inventors: Nickole Gagne, Saco, ME (US); Oscar W. Freitas, Cape Elizabeth, ME (US); Christian Klein, Portland, ME (US); Tyler Daigle, Portland, ME (US); Derek Richardson, Westbrook, ME (US)

(73) Assignee: Fairchild Semiconductor Corporation, San Jose, CA (US)

( * ) Notice: Subject to any disclaimer, the term of this patent is extended or adjusted under 35 U.S.C. 154(b) by 401 days.

(21) Appl. No.: 13/627,377

(22) Filed: Sep. 26, 2012

(65) Prior Publication Data
US 2013/0082644 A1    Apr. 4, 2013

Related U.S. Application Data

(60) Provisional application No. 61/541,969, filed on Sep. 30, 2011.

(51) Int. Cl.
*H02J 7/00* (2006.01)

(52) U.S. Cl.
CPC ............... *H02J 7/00* (2013.01); *H02J 7/0052* (2013.01); *H02J 2007/0001* (2013.01); *H02J 2007/0062* (2013.01); *H02J 2007/0096* (2013.01)

(58) Field of Classification Search
CPC ....................................................... H02J 7/00
USPC .................................. 320/107, 162; 710/100
See application file for complete search history.

(56) References Cited

U.S. PATENT DOCUMENTS

| 2007/0025805 A1* | 2/2007 | Lapstun et al. ............... 401/195 |
| 2010/0164440 A1* | 7/2010 | Ikeda ............................ 320/162 |
| 2010/0201308 A1* | 8/2010 | Lindholm ..................... 320/107 |

(Continued)

FOREIGN PATENT DOCUMENTS

| CN | 201563242 U | 8/2010 |
| CN | 101989749 A | 3/2011 |

(Continued)

OTHER PUBLICATIONS

"USB Battery Charging 1.2: Compliance Plan Revision 1.0", [Online]. Retrieved from the Internet: <URL: http://www.usb.org/developers/devclass_docs/USB_Battery_Charging_1.2.pdf>, (Oct. 12, 2011), 166 pgs.

(Continued)

*Primary Examiner* — Mohammed Alam
(74) *Attorney, Agent, or Firm* — Schwegman Lundberg & Woessner, P.A.

(57) ABSTRACT

Method and apparatus, among other things, are provided for detecting a charger type. In an example, a method to classify a potential charger coupled to a port of an electronic device can include detecting the potential charger coupled to a USB-compatible port of the electronic device, applying a pull-down current to first and second data lines of the USB-compatible port to provide a first test voltage on each of the first and second data lines, and executing a primary detection process of a USB Battery Charging 1.2 Compliance Plan if the first test voltage on each of the first and second data lines is not between a first threshold and a second threshold using the pull-down current.

21 Claims, 6 Drawing Sheets

(56) References Cited

U.S. PATENT DOCUMENTS

| | | | |
|---|---|---|---|
| 2011/0018522 A1* | 1/2011 | Li et al. | 323/318 |
| 2011/0025262 A1* | 2/2011 | Fischer et al. | 320/107 |
| 2012/0119696 A1* | 5/2012 | Picard | 320/107 |

FOREIGN PATENT DOCUMENTS

| | | |
|---|---|---|
| CN | 102025173 A | 4/2011 |
| CN | 102055223 A | 5/2011 |
| CN | 202903916 U | 4/2013 |
| EP | 1115003 B1 | 9/2004 |

OTHER PUBLICATIONS

"Chinese Application Serial No. 20120377365.7, Office Action mailed Aug. 29, 2014", 8 pgs.

"Chinese Application Serial No. 201210377365.7, Office Action mailed Mar. 9, 2015", 7 pgs.

* cited by examiner

CHARGER DETECTION WITH PROPRIETARY CHARGER SUPPORT

CLAIM OF PRIORITY AND RELATED APPLICATIONS

This patent application claims the benefit of priority, under 35 U.S.C. Section 119(e), to Gagne, U.S. Provisional Patent Application Ser. No. 61/541,969, entitled "CHARGER DETECTION WITH PROPRIETARY CHARGER SUPPORT," filed on Sep. 30, 2011, which is hereby incorporated by reference herein in its entirety.

OVERVIEW

Method and apparatus, among other things, are provided for detecting a charger type. In an example, a method to classify a potential charger coupled to a port of an electronic device can include detecting the potential charger coupled to a USB-compatible port of the electronic device, applying a pull-down current to first and second data lines, or pins, of the USB-compatible port to provide a first test voltage on each of the first and second data lines, and executing a primary detection process of a USB Battery Charging 1.2 Compliance Plan if the first test voltage on each of the first and second data lines is not between a first threshold and a second threshold using the pull-down current.

This overview is intended to provide an overview of subject matter of the present patent application. It is not intended to provide an exclusive or exhaustive explanation of the invention. The detailed description is included to provide further information about the present patent application.

BACKGROUND

Generally, there has been a recent trend towards the standardization of external ports on electronic devices, such as data or charging ports. In many electronic devices, such as mobile electronics, a single port, such as a Universal Serial Bus (USB) port can be configured as a data port, a charging port, or a data and charging port. Further, many different types of charging ports exist (e.g., having different power capabilities). The battery-charging standard, "USB Battery Charging 1.2 Compliance Plan, Revision 1.0" (herein, "BC1.2 Compliance Plan"), defines several types of charging ports, including a Dedicated Charging Port (DCP), a Charging Downstream Port (CDP), and a Standard Downstream Port (SDP).

However, many manufacturers retain proprietary charging mechanisms that can be incorrectly detected using the BC1.2 Compliance Plan detection flow. In many examples, incorrectly identifying the type of charging mechanism can translate to the charger being utilized at a decreased operating current, increasing the charge time of the electronic device.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The present inventors have recognized, among other things, systems and methods to detect proprietary chargers (e.g., chargers specific to a portable electronic device such as a cell phone, personal digital assistant, mobile media player, tablet, portable navigation devices, etc.) or PS/2 ports while maintaining compliance with the BC1.2 Compliance Plan. In certain examples, the systems and methods described herein can distinguish between different voltage levels or resistance values on charging pins to detect the type of charger, or to distinguish between SDP device or proprietary chargers and PS/2 ports, while maintaining compliance with the BC1.2 Compliance Plan.

Figure 1:
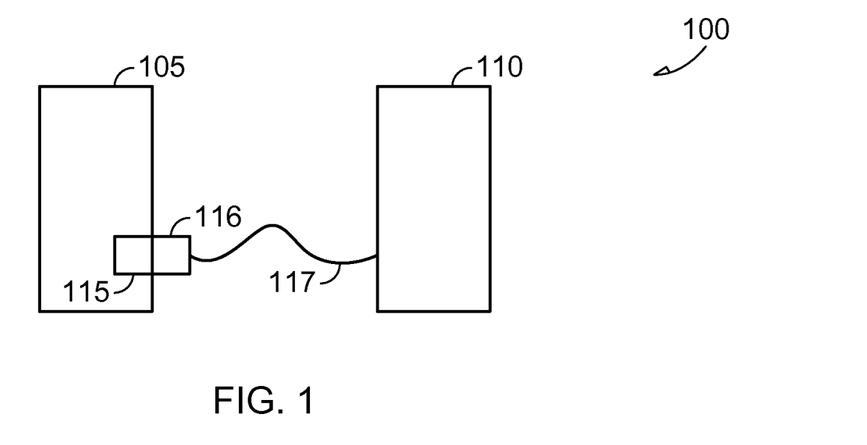
FIG. 1 illustrates generally an example of a system including an electronic device and a charger.

FIG. 1 illustrates generally an example of a system 100 including an electronic device 105 and a charger 110. In an example, the electronic device 105 can include a receptacle 115 configured to couple the charger 110 to the electronic device 105 using a cable 117 and a plug 116. In certain examples, the electronic device 105 can include a mobile phone or other mobile electronic device, the receptacle 115 and the plug 116 can include a USB receptacle and plug (e.g., a micro USB receptacle and plug, etc.), and the electronic device 105 (e.g., including a battery or other energy storage component) can be charged using power from the charger 110. In an example, the receptacle 115 and the plug 116 can include a voltage line ($V_{BUS}$), differential data lines (D+, D−), and ground (GND). In other examples, other configurations can be used.

Figure 2:
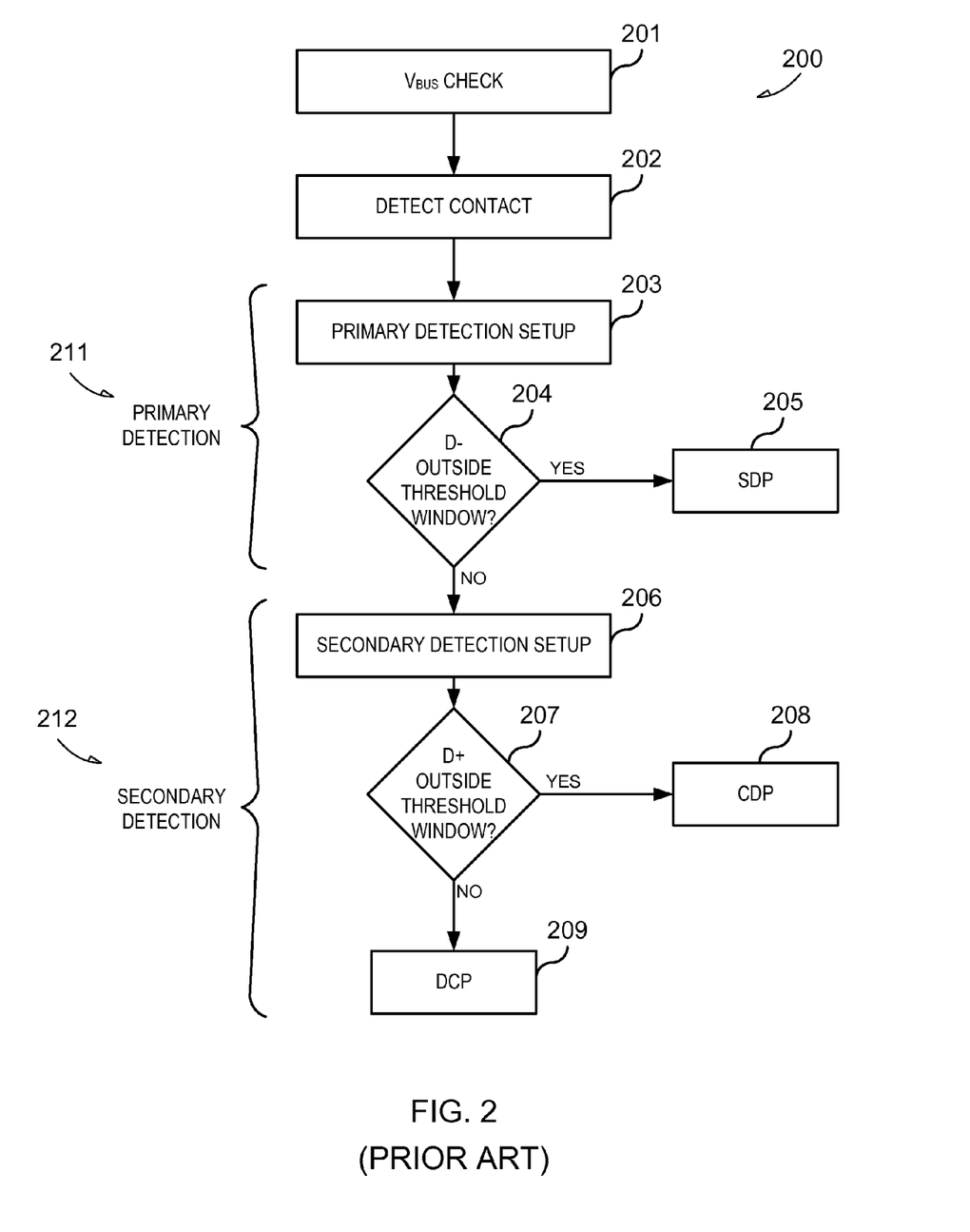
FIG. 2 illustrates generally a detection flow that complies with the BC1.2 Compliance Plan.

FIG. 2 illustrates generally a battery charging standard BC1.2 compliant charger detection flow, or method, 200. In an example, unsupported proprietary chargers can be evaluated incorrectly in the BC1.2 Compliance Plan compliant charger detection flow 200. For example, proprietary chargers (e.g., 500 mA, 1 A, or 2 A chargers, etc.) can be detected as CDP, SDP, or DCP chargers depending on resistor values associated with the specific charger, while other proprietary DCP chargers, and PS/2 ports, can be detected as SDP chargers. Incorrect detection can lead to decreased charging current and an increase in charging time. The generalized flow chart of a detection method complaint with the BC1.2 Compliance Plan can include, at 201, checking that a supply bus voltage (VBUS) is at an acceptable level. In certain examples, the supply buss voltage can be valid when greater than buss voltage threshold, such as about 4 volts. In certain examples, the method does not proceed until the supply voltage is at an acceptable level. At 202, the flow loops or waits until a device is connected to a port, such as a contact of a USB compliant port. After detecting a device is coupled to the port, the method can electrically manipulate and monitor lines of the port to classify the type of potential charger coupled to the port. At 203 of a primary detection process 211, a voltage can be applied to lines of the port to setup the primary detection process. In certain examples, the voltage is applied to one or more data lines of the USB-compatible port and a resulting voltage is measured and compared to a first threshold voltage. In an example, the voltage can be coupled to the positive data line (D+). In some examples, the voltage can be coupled to the positive data line (D+) using a resistor. In certain examples, the voltage can be about 0.6 volts.

In certain examples, after the voltage is applied to one of the data lines, a test voltage is induced on the other data line. At 204, if the test voltage is outside a threshold voltage window, the connected device can be classified as a SDP device, at 205, and a corresponding indication can be adjusted to indicate the detected classification. In some examples, a delay can be initiated after applying the voltage at 203 and before evaluating the induced test voltage at 204. In certain examples, the voltage window can have a lower limit corresponding to a data reference voltage ($V_{DAT\_REF}$) and an upper limit corresponding to a logic transition voltage ($V_{LGC}$). In some examples, the data reference voltage ($V_{DAT\_REF}$) can be between about 0.24 volts and about 0.4 volts. In some examples, the logic transition voltage ($V_{LGC}$) can be between about 0.8 volts and about 2.0 volts.

If, at 204, the test voltage is not outside the threshold voltage range, or window, a secondary detection process 212 can be initiated. As a part of the secondary detection process 212, at 206, a second voltage can be applied to the other data line of the port, for example if a voltage was applied to the positive data line (D+) to setup the primary detection process, a second voltage can be applied to the negative data line (D−) to setup the secondary detection process. In certain examples, the voltage applied to setup the primary detection process can be removed before the second voltage is applied to set up the secondary detection process. In some examples, the second voltage can be coupled to the negative data line (D−) using a resistor. In certain examples, the second voltage can be about 0.6 volts.

In certain examples, after the second voltage is applied to one of the data lines, a second test voltage is induced on the other data line. At 207, if the second test voltage, induced on the positive data line (D+), is outside the threshold voltage window, the connected device can be classified as a CDP device, at 208, and a corresponding indication can be adjusted to indicate the detected classification. In some examples, a delay can be initiated after applying the second voltage at 206 and before evaluating the induced second test voltage at 207. In certain examples, the voltage window can have a lower limit corresponding to a data reference voltage ($V_{DAT\_REF}$) and an upper limit corresponding to a logic transition voltage ($V_{LGC}$). In some examples, the data reference voltage ($V_{DAT\_REF}$) can be between about 0.24 volts and about 0.4 volts. In some examples, the logic transition voltage ($V_{LGC}$) can be between about 0.8 volts and about 2.0 volts.

If, at 207, the second test voltage is not outside the threshold voltage range, the connected device can be classified as a DCP device, at 209, and a corresponding indication can be adjusted to indicate the detected classification.

Figure 3:
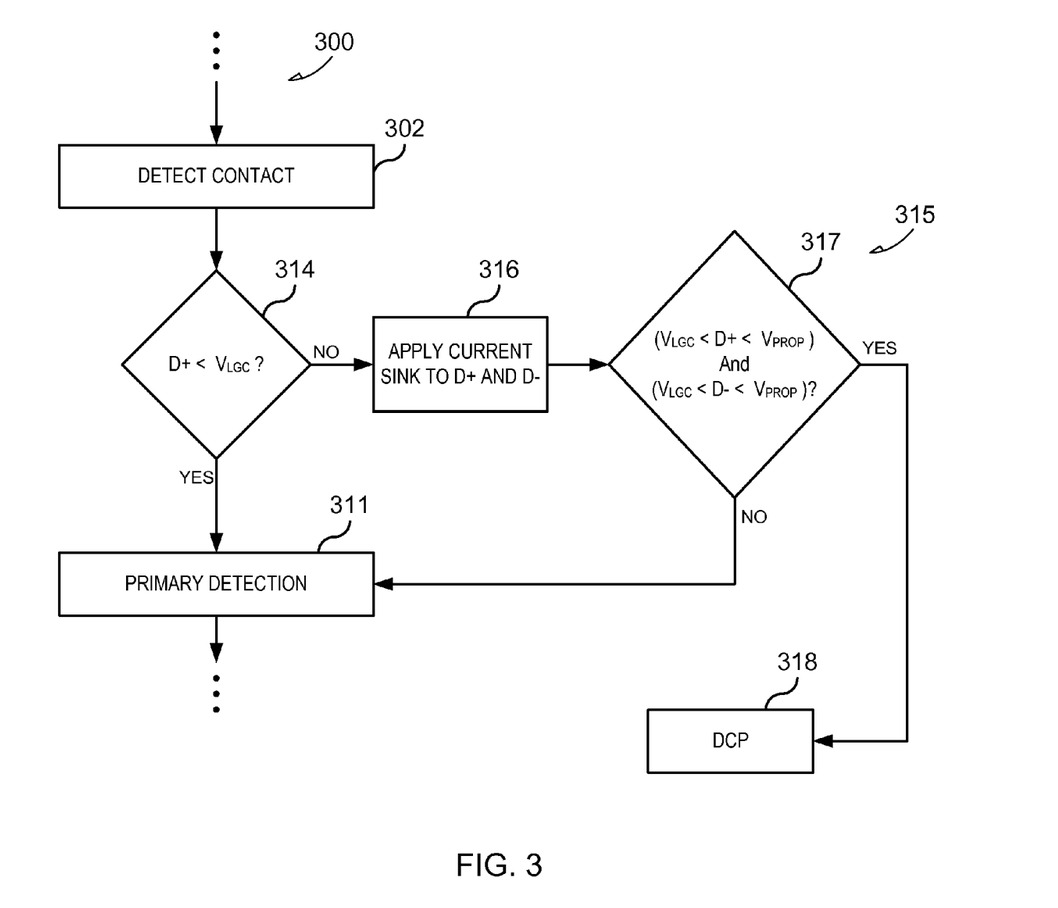
FIG. 3 illustrates generally an example portion of an improved charger detection flow including a first proprietary charger detection flow.

FIG. 3 illustrates generally an example portion of an improved charger detection flow 300 including a first proprietary charger detection flow 315, or method. In certain examples, the improved charger detection flow 300 can be configured to correctly identify proprietary chargers and PS/2 ports while maintaining compliance with the BC1.2 Compliance Plan. In certain examples, the illustrated portion of the improved charger detection flow 300 can include, at 302, a contact detection process and, at 311, a primary detection process as described above with respect to FIG. 2, elements 202 and 211, respectively. In certain examples, after detecting a device coupled to the port, at 310, one of the data lines can be evaluated with respect to a logic transition voltage ($V_{LGC}$) of the detector circuit. In certain examples, a voltage at the positive data line (D+) can be compared to the logic transition voltage ($V_{LGC}$). In certain examples, if the voltage at the positive data line is less than the logic transition voltage ($V_{LGC}$), the improved method can initiate the primary detection process 211. In certain examples, if the voltage at the positive data line is less than the logic transition voltage ($V_{LGC}$) after a debounce time delay from detecting a connected device, the improved method can initiate the primary detection process 211. In certain examples, if, at 314, the voltage at the positive data line (D+) is greater than the logic transition voltage ($V_{LGC}$), a first proprietary charger detection flow 315 can be initiated to identify if the attached device is a proprietary device that should be classified as a DCP device in order to more efficiently use the charging capabilities of the connected device. In some examples, if, at 314, the voltage at the positive data line (D+) is greater than the logic transition voltage ($V_{LGC}$) after a debounce time delay from detecting a connected device, a first proprietary charger detection flow 315 can be initiated to identify if the attached device is a proprietary device that should be classified as a DCP device in order to more efficiently use the charging capabilities of the connected device.

At 316, a current sink can be coupled to the data lines to induce a test voltage on each data line. In some examples, a switch can be used to selectively couple a single current sink one of the data lines at a first time and to the other data line at a second time. In certain examples, the current sink can be configured to sink about 500 nanoamperes (nA) to pull down a voltage level of the data lines (D+, D−). In certain examples, the pull-down voltage induced on the data line coupled to the current sink can be compared to a test window. In certain examples, the voltage induced on a first data line coupled to the current source can be saved and compared to the test window after the second data line is coupled to the current source and the voltage induced on the second data line is measured. At 317, the induced voltage of each data line can be evaluated with respect the test window. If both induced voltages are within the limits of the test window, the connected device can be classified as a DCP device, at 318, and a corresponding indication can be adjusted to indicate the detected classification. If, at 317, one of induced voltages is not within the limits of the test window, the process can initiate the primary detection process 211.

In certain examples, the voltage window evaluated at 317 can have a lower limit corresponding to a logic transition voltage ($V_{LGC}$) and an upper limit corresponding to a proprietary voltage threshold ($V_{PROP}$). In some examples, the logic transition voltage ($V_{LGC}$) can be between about 0.8 volts and about 2.0 volts. In some examples, the proprietary voltage threshold ($V_{PROP}$) can be a voltage greater than the logic transition voltage ($V_{LGC}$). In an example, the proprietary voltage threshold ($V_{PROP}$) can be about 2.7 volts. In such an example, the modified charger detection method 300 can correctly classify a one or more proprietary charger that might otherwise be classified as SDP devices, as DCP devices.

Figure 4:
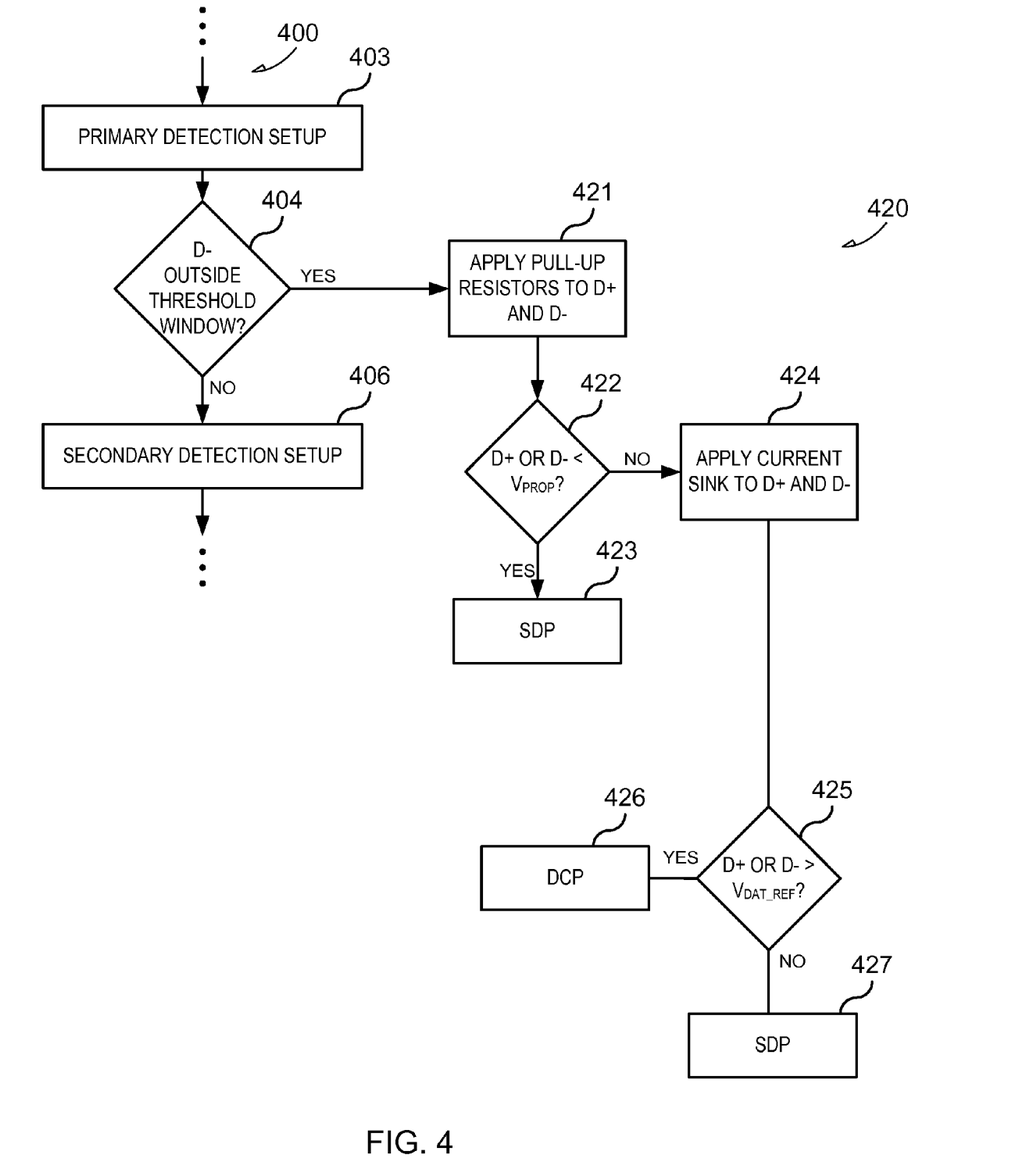
FIG. 4 illustrates generally an example portion of an improved charger detection flow including a second proprietary charger detection flow.

FIG. 4 illustrates generally an example portion of an improved charger detection flow 400 including a second proprietary charger detection flow 420, or method. In certain examples, the improved charger detection flow 400 can include preceding method steps of a detection method compliant with the BC1.2 Compliance Plan, at 403, setting up for a primary detection condition check, at 404, checking the condition for the primary detection, at 406, setting up for a secondary detection condition check, and subsequent steps of a method complaint with the BC1.2 Compliance Plan. In certain examples, the illustrated portion of the improved charger detection flow 400 can include, at 403, setting up for a primary detection condition check, at 404, checking the condition for the primary detection, and at 406, setting up for a secondary detection condition check, as described above with respect to FIG. 2, elements 203, 204 and 206, respectively. In certain examples, the method steps preceding the primary detection set up, at 403, can include the first proprietary charger detection flow 315 illustrated in FIG. 3 and described above.

The improved charger detection flow 420, at 403, can apply a voltage to lines of the port coupled to the potential charger to setup the primary detection process. In certain examples, the voltage can be applied to one or more data lines of the USB-compatible port and a resulting voltage can be measured and compared to a threshold voltage window, at 404. In certain examples, the voltage can be applied to one of the data lines and the resulting voltage can appear on the other data line. In an example, the voltage can be applied to the positive data line (D+) and the resulting voltage can be present on the negative data line (D−).

In certain examples, the threshold voltage window, at 404, can have a lower limit corresponding to a data reference voltage ($V_{DAT\_REF}$) and an upper limit corresponding to a logic transition voltage ($V_{LGC}$). In some examples, the data reference voltage ($V_{DAT\_REF}$) can be between about 0.24 volts and about 0.4 volts. In some examples, the logic transition voltage ($V_{LGC}$) can be between about 0.8 volts and about 2.0 volts. In an example, the logic transition voltage ($V_{LGC}$) can be about 1 volt.

In an example, if the resulting voltage is within the threshold window, at 404, the improved charger detection method 400 can proceed to setting up for the secondary detection, at 406. In certain examples, instead of classifying the potential charger as an SDP device if the resulting voltage is outside the threshold widow, the improved charger detection method 400 can execute a second proprietary charger detection method 420. In certain examples, the second proprietary charger detection method 420 can classify one or more proprietary chargers as DCP devices instead of SDP device. Such an improved classification of the potential charger can allow the charger to be used more efficiently in certain examples.

In certain examples, the second proprietary charger detection method 420 can include applying pull-up resistors, at 421, to the data lines of the port coupled to the potential charger. Applying the pull-up resistors to the data lines can provide a diagnostic voltage on each of the data lines. In certain examples, applying the pull-up resistors to the data lines can include coupling a pull-up resistor between a data line and a power supply, such as a power supply rail. In certain examples, one more resistors can be selectively coupled to the data lines using one or more switches, such as transistor based switches. In some examples, instead of actual resistors, a circuit implementing the second detection method can couple one or more current sources to the data lines. In some implementations, current sources can be more space efficient to implement compared to resistors. At 422, if either of the diagnostic voltages at that data lines is less than a proprietary voltage ($V_{PROP}$), the potential charger coupled to the port can be classified as an SDP device, at 423, and a corresponding indication can be adjusted to indicate the detected classification.

In some examples, the proprietary voltage ($V_{PROP}$) can be the same voltage as used in the first proprietary charger detection method 315 described above. In some examples, the proprietary voltage ($V_{PROP}$) can be a different voltage than used in the first proprietary charger detection method 315 described above. In some examples, the secondary detection method can be executed more than one time using different voltages for the proprietary voltage ($V_{PROP}$) to attempt to detect more than one type of proprietary charger.

Referring again to element 422 of the improved charger detection method 400, if each of the diagnostic voltages at the data lines is greater than additional conditioning of the data lines can be executed to better classify a potential charger coupled to the port. In certain examples, the additional conditioning can include, at 424, applying a current sink to the data lines (D+, D−) to provide a second diagnostic voltage at each of the data lines (D+, D−). In certain examples, one or more switches can be used to selectively couple the one or more current sinks to the data lines (D+, D−). At 425, if either of the second diagnostic voltages is greater than a threshold voltage ($V_{DAT\_REF}$), the potential charger, at 426, can be classified as a DCP device, and a corresponding indication can be adjusted to indicate the detected classification. At 425, if both of the second diagnostic voltages are less than the threshold voltage ($V_{DAT\_REF}$), the potential charger, at 427, can be classified as a SDP device, and a corresponding indication can be adjusted to indicate the detected classification. In some examples, the data reference voltage ($V_{DAT\_REF}$) can be between about 0.24 volts and about 0.4 volts. In certain examples, the current sink can be configured to sink about 500 nA to pull down a voltage level of the data lines (D+, D−). In certain examples, the second proprietary charger detection method 420 can more accurately classify a potential charger such that the charger can be used more efficiently. Some proprietary chargers, such as for navigation systems, and PS/2 port chargers, among others, are examples of proprietary chargers that the second proprietary charger detection method 420 can more accurately classify.

In certain examples, a electronic device can include a charger detection circuit configured to execute a charger detection method complaint with the BC1.2 Compliance Plan and including at least one of the first proprietary charger detection method or the second proprietary charger detection method, each of which are discussed above. In some examples, the electronic device can include a controller to execute the charger detection method. Such a controller can include, but is not limited to, a state machine, a microprocessor, analog components, digital components, software, firmware or combinations thereof.

Figure 5:
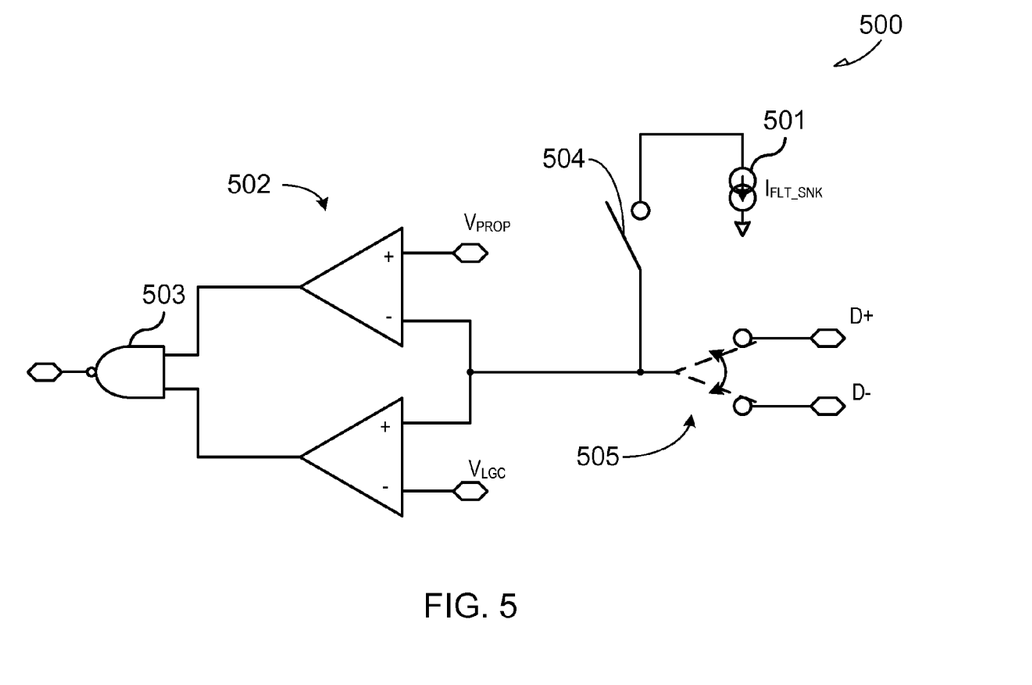
FIG. 5 illustrates generally example first proprietary charger detection circuit.
Figure 6:
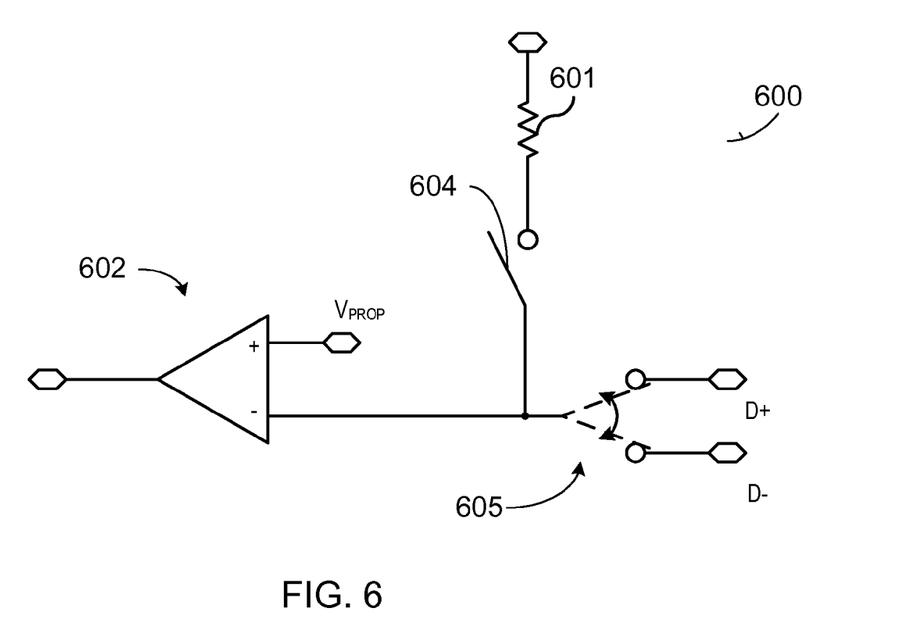
FIG. 6 illustrates generally an example SDP detection circuit.
Figure 7:
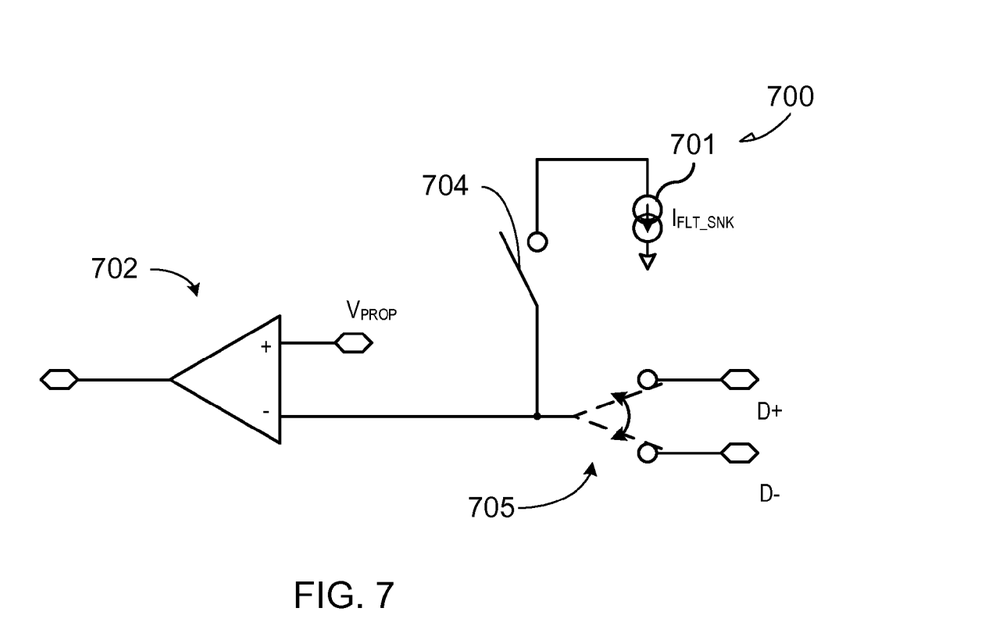
FIG. 7 illustrates generally an example floating data pin detection circuit.

FIG. 5 illustrates generally example first proprietary charger detection circuit 500 including a current source 501, a window comparator 502, and digital logic 503. In certain examples, the example first proprietary charger detection circuit can be used to implement at least a portion of a first proprietary charger detection method 315 as illustrated in the example of FIG. 3. In certain examples, a controller, not shown, can selectively couple a current source 501 to each of the data lines (D+, D−) of a port coupled to a potential charger (not shown). In some examples, the first proprietary charger detection circuit 500 can include one or more switches 504, 505 to selective couple one or more current sources to the data lines (D+, D−). In certain examples, one or more of the switches 504, 505 can include transistors. In certain examples, the current source 501, coupled to one of the data lines as a current sink, can induce a voltage, on the data line, that can be used to identify a particular characteristic of the potential charger. In certain examples, the current sink can be configured to sink about 500 nA to pull down a voltage level of the data lines (D+, D−). In certain examples, the digital logic 503, and window comparator 502 can provide an indication of whether the pull-down voltage is, or is not, within a threshold window. In certain examples, the voltage window can have a lower limit corresponding to a logic transition voltage ($V_{LGC}$) and an upper limit corresponding to a proprietary voltage threshold ($V_{PROP}$). In some examples, the logic transition voltage ($V_{LGC}$) can be between about 0.8 volts and about 2.0 volts, such as at about 1 volt. In some examples, the proprietary voltage threshold ($V_{PROP}$) can be a voltage greater than the logic transition voltage ($V_{LGC}$). In an example, the proprietary voltage threshold ($V_{PROP}$) can be about 2.7 volts. In such an example, the first proprietary charger detection circuit 500 can assist in correctly classifying one or more proprietary chargers that may otherwise be classified more use in a kless efficient manner. It is understood that other logic circuits and window comparators, that can provide an indication of whether the pull-down voltage is, or is not, within a threshold window, are possible without departing from the scope of the present subject matter FIG. 6 illustrates generally an example SDP detection circuit 600 including a pull-up resistor 601 and a comparator 602. The example SDP detection circuit 600 can be used to implement a portion of a second proprietary charger detection method as illustrated in the example of FIG. 4. In certain examples, a controller (not shown) can selectively couple a pull-up resistor 601 to each of the data lines (D+, D−) of a port coupled to a potential charger (not shown). In some examples, the SDP detection circuit 600 can include one or more switches 604, 605 to selectively couple one or more pull-up resistors to the data lines (D+, D−). In certain examples, one or more of the switches 604,605 can include transistors. In certain examples, the pull-up resistor 601, coupled to one of the data lines, can induce a pull-up voltage on the data line that can be used to identify a particular characteristic of the potential charger. In certain examples, the comparator 602 can provide an indication of whether the pull-up voltage is above or below a proprietary threshold voltage ($V_{PROP}$). In an example, the proprietary voltage threshold ($V_{PROP}$) can be about 2.7 volts. In some examples, the proprietary voltage ($V_{PROP}$) can be the same voltage as used in the first proprietary charger detection method 315, or the first proprietary charger detection circuit 500, each described above. In some examples, the proprietary voltage ($V_{PROP}$) can be a different voltage than used in the first proprietary charger detection method 315, or the first proprietary charger detection circuit 500. As described above, the output of the comparator 602 can be used to guide the execution of the second proprietary charger detection method to classify a potential charger device. It is understood that other logic circuits that can provide an indication of whether the pull-up voltage is above is above or below a proprietary threshold voltage ($V_{PROP}$) are possible without departing from the scope of the present subject matter FIG. 7 illustrates generally an example floating data pin detection circuit 700 including a current source 701 and a comparator 702. The example floating data pin detection circuit 700 can be used to implement a portion of a second proprietary charger detection method as illustrated in the example of FIG. 4. In certain examples, a controller, not shown, can selectively couple a current source 701 to each of the data lines (D+, D−) of a port coupled to a potential charger (not shown). In some examples, the floating data pin detection circuit 700 can include one or more switches 704, 705 to selective couple one or more current sources to the data lines (D+, D−). In certain examples, one or more of the switches 704,705 can include transistors. In certain examples, the current source 701, coupled to one of the data lines as a current sink, can induce a voltage on the data line that can be used to identify a particular characteristic of the potential charger. In certain examples, the current sink can be configured to sink about 500 nA to pull down a voltage level of the data lines (D+, D−). In certain examples, the comparator 702 can provide an indication of whether the pull-down voltage is above or below a data reference voltage ($V_{DAT\_REF}$). In some examples, the data reference voltage ($V_{DAT\_REF}$) can be between about 0.24 volts and about 0.4 volts. As described above, the output of the comparator 702 can be used to guide the execution of the second proprietary charger detection method to classify a potential charger device. It is understood that other logic circuits that can provide an indication of whether the pull-down voltage is above or below a data reference voltage ($V_{DAT\_REF}$) are possible without departing from the scope of the present subject matter Additional Notes The battery charging standard, "Battery Charging Specification, Revision 1.2," published Dec. 7, 2010, is hereby incorporated by reference in its entirety.

In Example 1, a charger detection method can include detecting a potential charger coupled to a USB-compatible port of an electronic device, applying a pull-down current to first and second data lines of the USB-compatible port to provide a first test voltage on each of the first and second data lines, and executing a primary detection process of a USB Battery Charging 1.2 Compliance Plan if the first test voltage on each of the first and second data lines is not between a first threshold and a second threshold.

In Example 2, the charger detection method of claim 1 optionally includes classifying the potential charger as a dedicated charging port (DCP) device if a first test voltage on each of the first and second data lines is between the first threshold and the second threshold using the pull-down current.

In Example 3, the charger detection method of any one or more of Examples 1-2 optionally includes coupling a second test voltage to the first data line to provide a third voltage on the second data line, and delaying a first delay interval.

In Example 4, the charger detection method of any one or more of Examples 1-3 optionally includes detecting that a voltage on the second data line is outside a first test window after expiration of the first delay interval, coupling a one or more pull-up resistors to the first and second data lines to provide first and second pull-up voltages on the first and second data lines, respectively, and comparing the first and second pull-up voltages to a third threshold voltage.

In Example 5, the charger detection method of any one or more of Example 1-4 optionally includes classifying the potential charger as a SDP if the first pull-up voltage or the second pull-up voltage is lower than the third threshold voltage.

In Example 6, the charger detection method of any one or more of Examples 1-5 optionally includes, if the first pull-up voltage and the second pull-up voltage is greater than the third threshold voltage, coupling first and second current sinks to the first and second data lines, respectively, to provide a third test voltage on the first data line and a fourth test voltage on the second data line.

In Example 7, the charger detection method of any one or more of Examples 1-6 optionally includes classifying the potential charger as a DCP device if the third test voltage is less than a fifth threshold and the fourth test voltage is less than the fifth threshold.

In Example 8, the charger detection method of any one or more of Examples 1-7 optionally includes classifying the potential charger as a SDP device if the third test voltage is greater than a fifth threshold and the fourth test voltage is greater than the fifth threshold.

In Example 9, the charger detection method of any one or more of Examples 1-8 optionally includes detecting that the third voltage on the second data line is within a first test window after expiration of the first delay interval.

In Example 10, the charger detection method of any one or more of Examples 1-9 optionally includes coupling a fourth test voltage to the second data line to provide a fifth voltage on the first data line, delaying a second delay interval, and comparing the fifth voltage to a second test voltage range.

In Example 11, the charger detection method of one or more of Examples 1-10 optionally includes classifying the potential charger as a DCP device if the fifth voltage is outside the second test range.

In Example 12, the charger detection method of any one or more of Examples 1-11 optionally includes classifying the potential charger as a CDP device if the fifth voltage is within the second test range.

In Example 13, the first data line of any one or more of Examples 1-12 optionally includes a positive data line of the USB-compatible port, and the second data line of any one or more of Examples 1-12 optionally includes a negative data line of the USB-compatible port.

In Example 14, a USB Battery Charging Plan 1.2 compliant charger detection circuit can include a floating data pin detection circuit including a first comparator configured to receive a first threshold voltage at a first input and a value of a data pin at a second input, and a first current source coupled between the second input of the first comparator and ground. The USB Battery Charging Plan 1.2 compliant charger detection circuit can include a standard downstream port (SDP) detection circuit including a second comparator configured to receive a second threshold voltage at a first input and a value of a data pin at the second input, and a pull up resistor coupled between the second input of the second comparator and a power rail.

In Example 15, the charger detection circuit of any one or more of Examples 1-14 optionally includes a first switch configured to couple a first data pin to the second input of the first comparator at a first time and to connect a second data pin to the second input of the first comparator at a second time.

In Example 16, the charger detection circuit of any one or more of Examples 1-15 optionally includes a second switch configured to couple a first data pin to the second input of the second comparator at a third time and to couple a second data pin to the second input of the second comparator at a fourth time.

In Example 17, the charger detection circuit of any one or more of Examples 1-16 optionally includes a proprietary charger detection circuit, the proprietary charger detection circuit including a window comparator configured to receive a third threshold voltage at a first input, a fourth threshold voltage at a second input, and a value of a data pin at a shared third input, and a second current source coupled between the third input of the window comparator and ground.

In Examples 18, the charger detection circuit of any one or more of claims 1-17 optionally includes a third switch configured to couple a first data pin to the third input of the window comparator at a fifth time and a second data pin to the third input of the window comparator at a sixth time.

In Example 19, the proprietary charger detection circuit of any one or more of Examples 1-18 optionally is configured to provide an indication the potential charger is a DCP device if a voltage at the first pin after the fifth time and a voltage at the second pin after the sixth time are between the third threshold voltage and the fourth threshold voltage.

In Examples 20, the floating data pin detection circuit of any one or more of Examples 1-19 optionally is configured to provide an indication the potential charger is a DCP device if a voltage at the first pin after the first time and a voltage at the second pin after the second time are less than the first threshold.

In Example 21, the floating data pin detection circuit of any one or more of Examples 1-20 optionally is configured to provide an indication the potential charger is a SDP device if a voltage at the first pin after the first time or a voltage at the second pin after the second time are greater than the first threshold.

In Example 22, the first data line of any one or more of Examples 1-21 optionally includes a positive data line of the USB-compatible port, and the second data line of any one or more of Examples 1-21 optionally includes a negative data line of the USB-compatible port.

Example 23 can include, or can optionally be combined with any portion or combination of any portions of any one or more of Examples 1 through 22 to include, subject matter that can include means for performing any one or more of the functions of Examples 1 through 22, or a machine-readable medium including instructions that, when performed by a machine, cause the machine to perform any one or more of the functions of Examples 1 through 22.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A charger detection method configured to classify a potential charger coupled to a port of an electronic device, the charger detection method comprising:
   detecting connection of the potential charger to a USB-compatible port of the electronic device;
   upon connection of the potential charger and before applying a pull-down current, comparing a connection voltage of a first data line of the USB-compatible port to a logic threshold;
   if the connection voltage of the first data line is greater than the logic threshold, applying the pull-down current to first and second data lines of the USB-compatible port to provide a first test voltage on each of the first and second data lines;
   if the connection voltage of the first data line is less than the logic threshold, executing a primary detection process of a USB Battery Charging 1.2 Compliance Plan; and
   after applying a pull-down current to first and second data lines, if the first test voltage on each of the first and second data lines is not between a first threshold and a second threshold, executing the primary detection process of the USB Battery Charging 1.2 Compliance Plan.

2. The charger detection method of claim 1, wherein applying the pull-down current to the first and second data lines includes classifying the potential charger as a dedicated charging port (DCP) device if a first test voltage on each of the first and second data lines is between the first threshold and the second threshold using the pull-down current.

3. The charger detection method of claim 1, including,
   at the conclusion of the primary detection process, coupling a second test voltage to the first data line to provide a third voltage on the second data line; and
   delaying a first delay interval.

4. The charger detection method of claim 3, including,
   detecting that a voltage on the second data line is outside a first test window after expiration of the first delay interval;
   coupling one or more pull-up resistors to the first and second data lines to provide first and second pull-up voltages on the first and second data lines, respectively; and
   comparing the first and second pull-up voltages to a third threshold voltage.

5. The charger detection method of claim 4, including,
   classifying the potential charger as a SDP if the first pull-up voltage or the second pull-up voltage is lower than the third threshold voltage.

6. The charger detection method of claim 5, including,
   if the first pull-up voltage and the second pull-up voltage is greater than the third threshold voltage, the method includes:
   coupling first and second current sinks to the first and second data lines, respectively, to provide a third test voltage on the first data line and a fourth test voltage on the second data line.

7. The charger detection method of claim 6, including classifying the potential charger as a DCP device if the third test voltage is less than a fifth threshold and the fourth test voltage is less than the fifth threshold.

8. The charger detection method of claim 6, including classifying the potential charger as a SDP device if the third test voltage is greater than a fifth threshold and the fourth test voltage is greater than the fifth threshold.

9. The charger detection method of claim 6, including detecting that the third voltage on the second data line is within a first test window after expiration of the first delay interval.

10. The charger detection method of claim 9, including:
    coupling a fourth test voltage to the second data line to provide a fifth voltage on the first data line;
    delaying a second delay interval; and
    comparing the fifth voltage to a second test voltage range.

11. The charger detection method of claim 10, including classifying the potential charger as a DCP device if the fifth voltage is outside the second test range.

12. The charger detection method of claim 10, including classifying the potential charger as a CDP device if the fifth voltage is within the second test range.

13. The charger detection method of claim 1, wherein the first data line includes a positive data line of the USB-compatible port, and the second data line includes a negative data line of the USB-compatible port.

14. A USB Battery Charging Plan 1.2 compliant charger detection circuit configured to couple with a potential charger via a USB-compatible port and to provide an indication of a classification of the potential charger, the charger detection circuit comprising:
    a proprietary charger detection circuit, the proprietary charger detection circuit including:
    a window comparator configured to receive a first threshold voltage at a first input, a second threshold voltage at a second input, and a value of a data in at a shared third input;
    a first current source coupled between the third input of the window comparator and ground; and a first switch configured to couple a first data in to the third input of the window comparator at a first time and a second data pin to the third input of the window comparator at a second time; and a controller configured to detect connection of the potential charger, to compare a connection voltage of a first data line of a USB-compatible port to a logic threshold prior to coupling a pull-down current to the first data line, if the connection voltage of the first data line is greater than the logic threshold, to control the third switch of proprietary charger detection circuit at the first and second times; and if the connection voltage of the first data line is greater than the logic threshold, to control a primary detection process of a USB Battery Charging 1.2 Compliance Plan.

15. The charger detection circuit of claim 14, including a second switch configured to couple a first data pin to the second input of a first comparator at a third time and to connect a second data pin to the second input of the first comparator at a fourth time.

16. The charger detection circuit of claim 15, including a third switch configured to couple a first data pin to the second input of a second comparator at a fifth time and to couple a second data pin to the second input of the second comparator at a sixth time.

17. The charger detection circuit of claim 14, wherein the proprietary charger detection circuit is configured to provide an indication the potential charger is a DCP device if a voltage at a first pin after the first time and a voltage at a second pin after the second time are between the first threshold voltage and the second threshold voltage.

18. The charger detection circuit of claim 15, wherein, after completion of primary detection process of a USB Battery Charging 1.2 Compliance Plan, a floating data pin detection circuit is configured to provide an indication the potential charger is a DCP device if a voltage at the first pin after the first time and a voltage at the second pin after the second time are less than the first threshold.

19. The charger detection circuit of claim 15, wherein, after completion of primary detection process of a USB Battery Charging 1.2 Compliance Plan, a floating data pin detection circuit is configured to provide an indication the potential charger is a SDP device if a voltage at the first pin after the first time or a voltage at the second pin after the second time are greater than the first threshold.

20. The charger detection circuit of claim 14, wherein the first data line includes a positive data line of the USB-compatible port, and the second data line includes a negative data line of the USB-compatible port.

21. The charger detection circuit of claim 17, including:
a floating data pin detection circuit, including:
　a first comparator configured to receive a third threshold voltage at a first input and a value of a data pin at the second input; and
　a second current source coupled between the second input of the first comparator and ground; and
a standard downstream port (SDP) detection circuit, including:
　a second comparator configured to receive a fourth threshold voltage at a first input and a value of a data pin at the second input; and
　a pull up resistor coupled between the second input of the second comparator and a power rail.

* * * * *